Nov. 30, 1965  W. BURCHERT ETAL  3,220,554
ROTARY DRUM VACUUM FILTER
Filed April 1, 1964  4 Sheets-Sheet 1

Inventor
WALTER BURCHERT &
OTTO SCHIPHORST

Inventor
WALTER BURCHERT &
OTTO SCHIPHORST

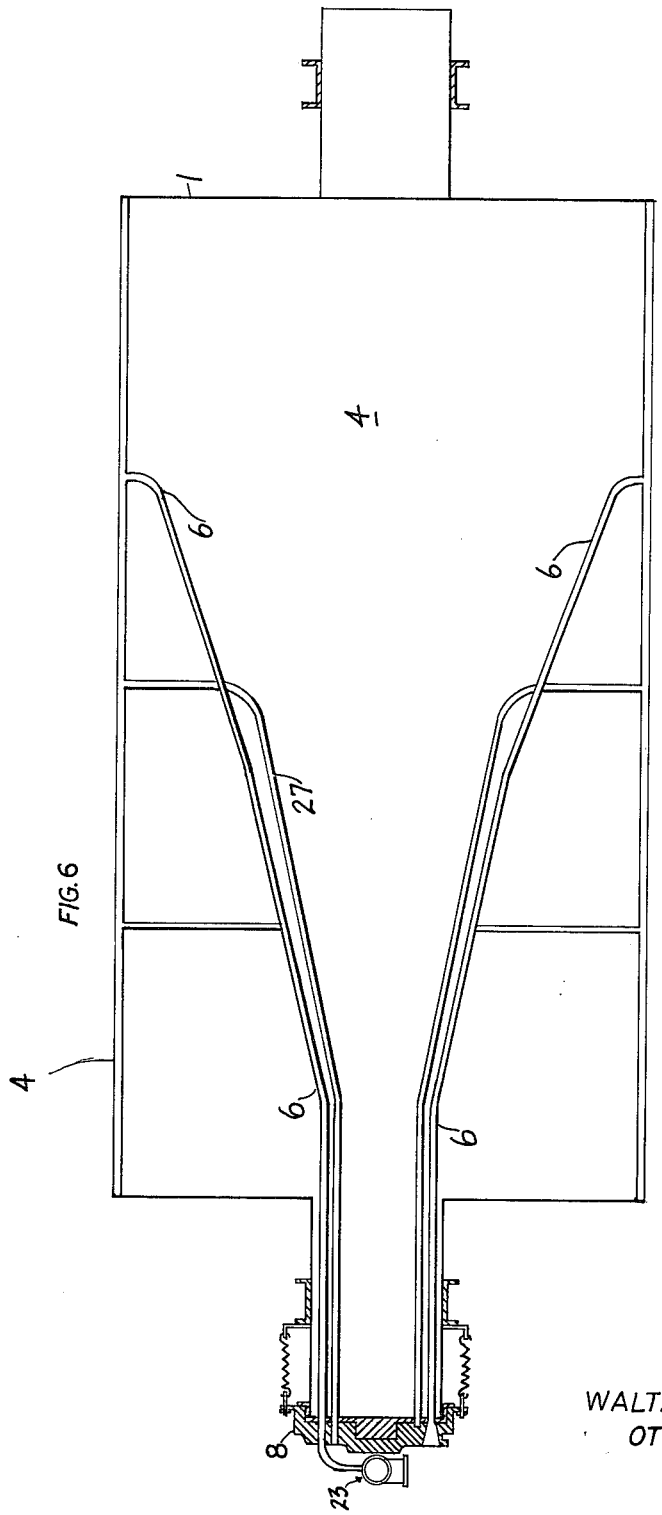

United States Patent Office 3,220,554
Patented Nov. 30, 1965

3,220,554
ROTARY DRUM VACUUM FILTER
Walter Burchert, Schuetzenplatz 10, and Otto Schiphorst, Theo-Seifer-Str. 11, both of Misburg, Germany
Filed Apr. 1, 1964, Ser. No. 356,384
Claims priority, application Germany, Mar. 3, 1959,
G 26,527
4 Claims. (Cl. 210—217)

This application is a continuation-in-part of our application Serial No. 12,640, filed March 3, 1960 and now abandoned.

This invention relates to a vacuum filter, and more particularly, to a rotary drum vacuum filter of the type used for separating solid particles from fluids or solutions where the primary filtrate and/or wash filtrate are recovered.

In most instances, the liquid used to wash the filter cake is also used to dilute the solids-containing liquid to be filtered to improve the filtering capacity, and consequently, the primary filtrate will also contain quantities of the wash liquid. It is desirable to reduce the cost of obtaining a solvent-free primary filtrate, e.g. by evaporating the wash liquid, and to reduce the cost of recovering wash liquid (a solvent or solvent mixture), from the wash filtrate, also usually effected by evaporation. This has been done by separately collecting the relatively solvent-deficient primary filtrate and the wash filtrate which is relatively rich in solvent at the discharge end of the rotary drum vacuum filter.

In some cases, it is even worthwhile to subdivide the wash filtrate into two streams, one comparatively rich and the other comparatively deficient in primary filtrate. According to conventional practice, these three streams are formed and discharged by inserting so-called bridges or stops in the arcuate suction slot of a stationary valve chamber communicating with the filter control head, thus dividing and collecting the small streams flowing from the individual filter compartments to the said control head. The primary filtrate stream withdrawn from the discharge end of the filter is introduced into a solvent recovery process while the two collected wash filtrate streams, one relatively rich and the other relatively deficient in primary filtrate, may be used entirely or partially, for diluting the solids containing liquid to be filtered. The stream relatively deficient in primary filtrate may also be used entirely or partially for the initial washing of the compartments covered with fresh filter cake. Any remaining portions of wash filtrate streams are fed together with the primary filtrate stream into the solvent recovery process.

The operation of such a rotary drum vacuum filter is unsatisfactory, however, when dealing with poorly filterable solids-containing liquid or solutions, which occasionally undergo qualitative changes in respect to their filterability. For example, such liquids or solutions may be petroleum fractions of various composition and viscosity diluted with cold solvent or solvent mixture and containing crystallized paraffin wax. When fractions of different viscosity or composition are to be processed in the course of a day or even over a period of several hours, the filtration speeds and the necessary quantities of wash liquid vary within wide limits. Consequently, in order to achieve optimum subdivision of the individual wash filtrate streams flowing from the filter compartments which are being washed, the bridges or stops in the suction slot of the valve chamber of the filter control head would have to be accordingly adjusted each time of change from one petroleum fraction to the other.

Since adjustments of the bridges or stops is possible only after removal of the control head, which results in loss of solvent, operating time and energy for fresh cooling down of the whole filter, adjustments of the bridges are generally not effected in conventional practice. In conventional practice, the bridges are therefore adjusted to accommodate the oil fraction hardest to filter, i.e., the oil fraction which is usually the most viscous.

It has thus been accepted that the individual wash filtrate streams cannot be favorably subdivided and collected in the case of more easily filterable oil fractions, i.e., less viscous oil fraction, where consequently considerable quantities of wash filtrates relatively deficient in primary filtrate flow to the solvent recovery plant together with the collected wash filtrates relatively rich in primary filtrate. Thus, it has often been necessary to be satisfied with only one collected wash filtrate stream.

The invention has for an object an improved rotary drum vacuum filter which permits change to be made in the subdivision ratio of wash filtrate streams as they are formed without any interruptions in operations. Furthermore, use of the apparatus of this invention provides for better separation of wash filtrate streams from the streams of primary filtrate.

This object is achieved by providing a rotary drum vacuum filter with a control head of new design adapted for separate exhaustion of the filter compartments. The control head has a stationary valve housing having openings disposed in a circular arrangement, and a control cylinder with openings in the side wall facing the stationary valve housing. The openings of the valve housing consist in their upper portion of individual openings whereas the lower part of the valve, i.e. in the remaining major portion of the area of the circle, is taken up by a single further opening. (In normal valve housings this opening is a full circle.) The openings in the lower portion of the valve housing may be in fluid communication with a primary filtrate outlet means and the openings in the upper portion with the openings in the side wall of the control cylinder of said valve housing. Disposed between the openings in the upper portion of the stationary valve housing and the openings in the control cylinder, are a plurality of conduits which provide for fluid communication between such openings in the stationary valve housing and the openings in the control cylinder. The rotary drum is provided with a revolving valve seat positioned within the stationary valve housing and having outlet openings for filtrate conduits in fluid communication with the individual compartments. The outlet openings in the revolving valve seat are arranged so as to be in fluid communication with the openings in the stationary valve housing to the primary filtrate outlet means or to the control cylinder through the respective conduits as the openings in the valve seat and valve housing are placed in registry as the drum rotates. The control cylinder is provided with at least one piston positioned within the control cylinder and adapted to be adjusted from outside of the control cylinder.

The openings in the upper part of the stationary valve housing and in the side wall of the control cylinder are preferably in the form of slots. The same number, twice as many and even several times as many openings can be provided as there are openings in the revolving valve seat. Consequently, one, two or even more of the corresponding slots in the stationary valve housing and control cylinder can be in fluid communication with a given filtrate conduit at the same time during discharge of the different wash filtrates as the drum rotates. The piston positioned within the control cylinder can be designed to cover one or more of the slots in the side wall of the control cylinder.

When the drum is rotating in a clockwise direction, the filtrate effluent from each compartment flows through the respective filtrate conduit through the opening in the valve seat, when the same is in registry with an opening in the valve housing to be discharged as primary filtrate through the primary filtrate outlet means or into the control cylinder on the right and left side of the piston as wash filtrate streams, rich and poor in primary filtrate.

If desired, two pistons may be positioned within the control cylinder. In such event, a third connecting socket is positioned between the ends of the control cylinder for the subdivision of a third quantity of wash filtrate. The piston or pistons are mounted on rods which can be manipulated to adjust the piston or pistons within the cylinder to cover any desired slot or slots, and which may be indexed to facilitate the adjustment of the piston or pistons as the case may be.

If the filter compartments are relatively small, i.e. if each occupies only a short portion of the outer surface of the filter drum, only one slot is generally provided in the stationary valve housing and in the control cylinder per filtrate conduit or filter compartment or cell. With larger filter compartments two or more slots per outlet are preferably provided. Thus, in accordance with the invention individual filtrate streams can be precisely subdivided. One known arrangement permits a certain amount of change in the amount of suction for the rotating filter compartments which is effected by moving a partition located within the control head. The number of compartments, from which the individual filtrate streams can be drawn off cannot, however, be increased or reduced during operation.

The control head according to our invention can be adjusted during operations to subdivide and collect the different streams of wash filtrates in a manner appropriate to the operating conditions at any given time. This subdivision of filtrates can be supported by suitable ventilation of those compartments from which primary filtrate is to be withdrawn and passed to the control head. This is accomplished by connecting in fluid communication each compartment or cell with the rotating valve seat through an additional tube quite separate from the filtrate conduit. The openings of these independent ventilating tubes in the rotating valve seat are disposed concentrically inwardly with respect to the filtrate conduits openings in the valve seat.

Associated with these ventilating tube openings in the valve seat, there is provided a slot describing a 90° arc in the stationary valve housing. This slot can communicate with one-quarter of the ventilation tube openings in the rotary valve seat at any given point in time. The slot is arranged for occlusion or subdivision by bridges so that when the drum is rotating any desired number of the ventilation tubes opposite the slot can be supplied with air or other gas at normal pressure. The ventilation tubes are maintained in fluid communication with a gas supply means for such a time interval as experience shows is required to equalize the pressure difference between the filter compartments and the space on their outside to permit the primary filtrate in these compartments to fully discharge through the control head as soon as the compartments emerge from the solids-containing liquid and reach a position high enough to allow free flow of the filtrate to the control head.

Making use of the apparatus as described, improved subdivision of the individual filtrate streams can be achieved even though changes in the make-up of the solids containing liquid being filtered occur, and this can be achieved without any interruption in operations of the vacuum filter. To achieve discrete subdivision of primary filtrate from wash filtrate, each compartment in succession is briefly ventilated, as described above, before any wash solution is allowed to contact the filter cake so that essentially all of the primary filtrate flows out of the compartment and the associated filtrate conduit through the control head as the drum revolves. Wash filtrates from each filter compartment then flow separately through the valve seat and valve housing into the control cylinder and are there subdivided by the piston or pistons.

The invention is more particularly described with reference to the accompanying drawings which illustrate one embodiment by way of example and in which:

FIGURE 6 is a schematic axial sectional view of the rotary drum vacuum filter including the control head.

The operation of the filter of this invention, i.e., filtration of the solids-containing liquid and the washing of the filter cake will be explained with reference to the separation of wax from a petroleum fraction. Referring to the FIGURE 1, rotary drum vacuum filter generally indicated as 1, includes a filter tank 2, tank head cover 3 and drum 4. The tank 2 includes a wax cake conveyor worm 2a. Since the filter is operated at normally low temperatures, the tank 2 is provided with the cover 3 to keep the filter cool and to minimize the evaporation of the solvent. The wax filter cake, generally indicated as 5, is deposited on the circumference of the filter drum 4 and thickens until that portion of the surface of the drum 4 emerges above the level 5' of the mixture of paraffin wax and oil/solvent contained in the filter tank 2, and is then washed until removed from the drum 4 above the conveyor worm 2a. The surface of filter drum 4, as illustrated, is provided with twelve compartments, each compartment being consecutively numbered with the Roman numerals I to XII. Each compartment has a series of pipe connections which are combined for communication with a pipe in the region of the drum axis, such pipe connections are generally indicated as 6. On the periphery of the drum, the compartments or cells are covered with screen grids and a filter cloth upon which the filter cake is deposited.

Figure 1:
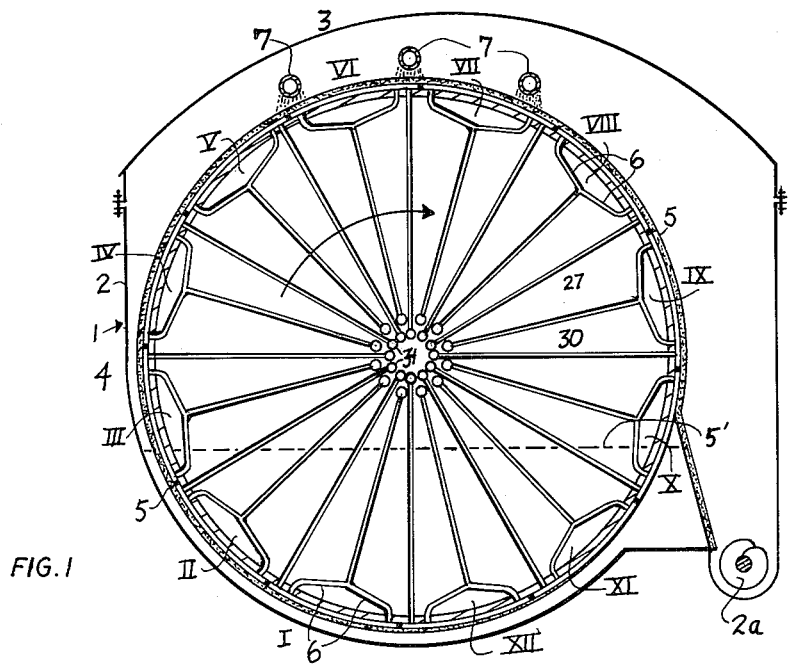
FIGURE 1 is a schematic cross-sectional view of one embodiment of our invention of a rotary drum vacuum filter.

As depicted in FIGURE 1, compartments X to XII and I to III are entirely or partly immersed in the liquid which contains a paraffin wax or other solids. Under partial vacuum, the primary filtrate, a so-called oil filtrate (20 parts oil and 80 parts solvent, for example), is drawn into the compartments and a wax cake with a high oil content is deposited on the filter cloth adjacent the compartment. The compartments V to IX when in the position depicted in FIGURE 1, are exposed to spray pipes 7, whereby the filter cake is washed and deoiled. The oil content of the wax cake is thereby decreased from compartments V to IX, or in the direction of the rotation of the filter drum, which is clockwise in the depicted embodiment. Likewise, the oil content of the wash filtrate decreases, for example, from approximately 18 parts oil in 82 parts solvent in compartment V, to 2 parts oil in 98 parts solvent in compartment IX.

In prior practice, the oil content of the wash filtrate drawn into compartments V to compartments IX varies widely according to the type of oil feed so that when the rotary drum vacuum filter is operated as set forth above, only a minimal quantity of wash filtrate resulting from possibly the last compartment IX only may be directly returned to the dewaxing process without being freed from its oil content, since experience has shown that the oil (primary filtrate) content of a suitable wash filtrate should not exceed approximately 6 to 8%. Consequently, the major part of the wash filtrate must therefore be further treated by distillation, a costly procedure, in order to recover the solvent for reuse. Furthermore, since solvent recovered in this manner is obtained at approximately the temperature of the cooling water, additional heat must be removed from the solvent until its temperature is reduced to the low temperature of the wash filtrate.

Figure 2:
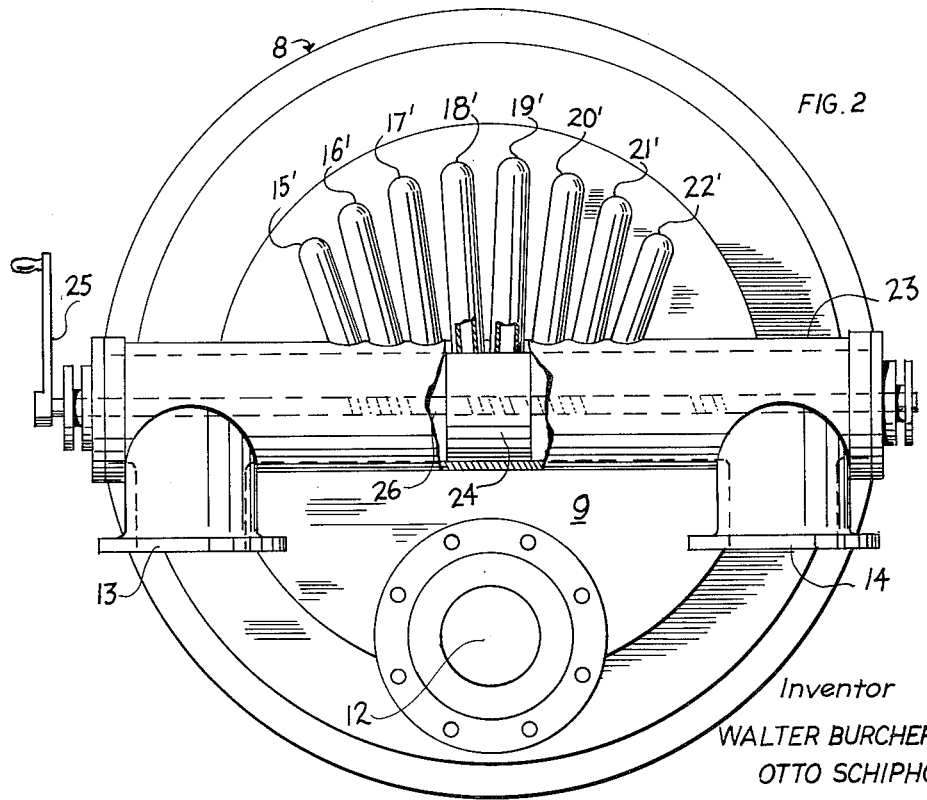
FIGURE 2 is a front elevation view of the control head including the control cylinder of such vacuum filter.
Figure 3:
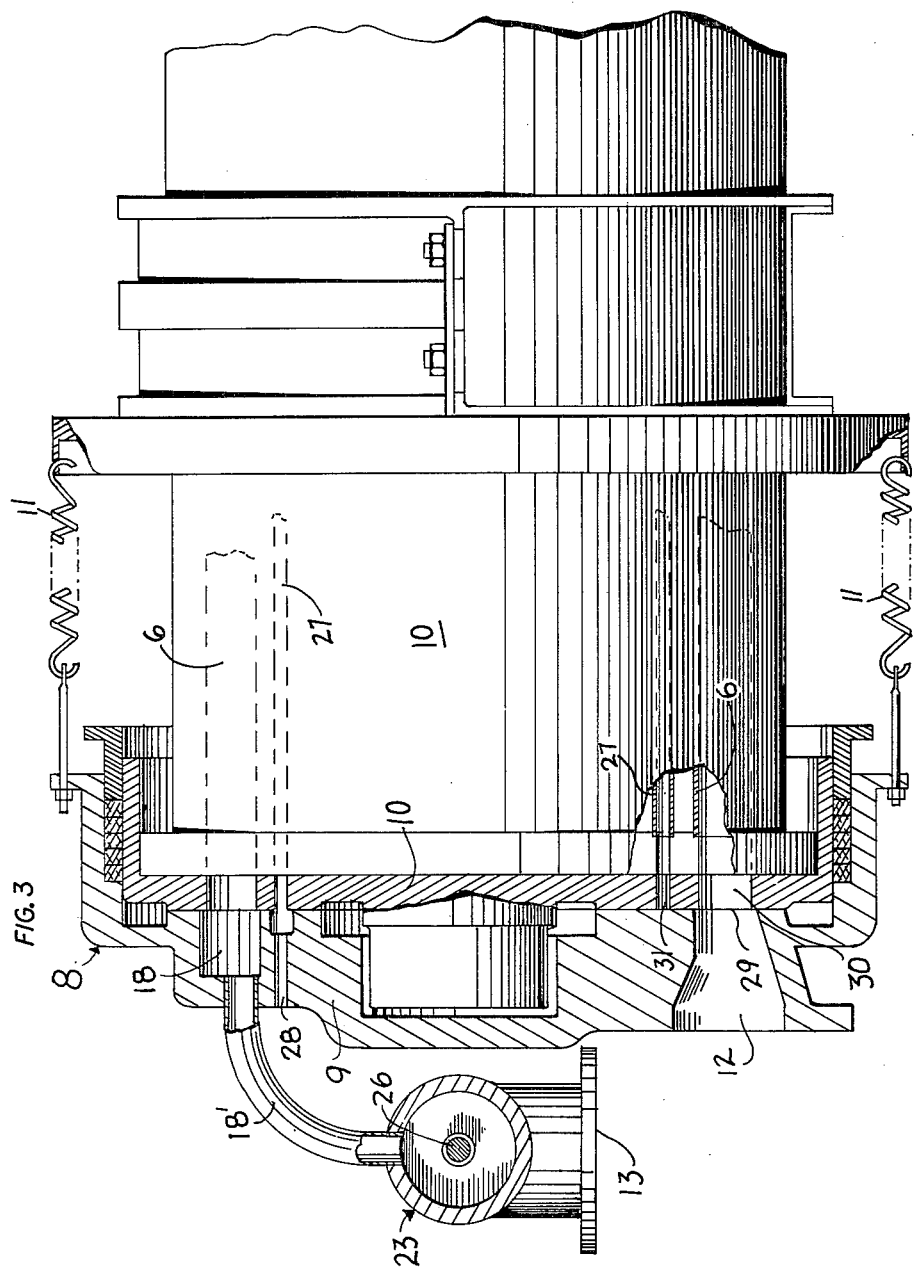
FIGURE 3 is a partial axial sectional view through the control head showing the stationary valve housing and the rotating valve seat of the vacuum filter.

Utilizing the vacuum filter of our invention, the amount of wash filtrate returned to the dewaxing process, without treatment, can be optimized in accordance with the quality of the oil feed. Referring to FIGURES 2 and 6, the rotary drum vacuum filter is provided with a control head, generally indicated as 8, and comprises stationary valve housing 9 mounted on one side of the filter drum 4. As illustrated in FIGURE 3, the contacting surfaces of the stationary valve housing 9 of the control head 8, and the revolving valve seat 10 of the filter drum 4 are pressed together by resilient means, e.g. helical springs 11 attached at the periphery of the valve housing 9.

Filtrate drawn off by suction is separated by valve housing 9 into a primary filtrate stream exiting via conduit 12, of the housing 9 (FIGURES 2 and 3); a relatively oil-rich wash filtrate exiting via conduit 13 of a control cylinder 23 (FIGURE 2); and relatively oil-deficient wash filtrate exiting via conduit 14 of the control cylinder 23 (FIGURE 2). Thus, the maximum amount of an oil-deficient wash filtrate stream can be recovered for reuse.

Tests have shown that suitably oil-deficient wash filtrate streams can be withdrawn from compartments VI to IX under favorable circumstances. In less favorable cases, depending on the material to be filtered, such oil-deficient wash filtrate can be removed only from compartments further clockwise, such as VIII and IX. Thus, in the embodiment described below in greater detail the quality of the material to be filtered determines the extent to which a useful oil-deficient wash filtrate stream can be recovered. To accomplish such separation, the controls must be sufficiently adjustable to recover one or even two separate wash filtrate streams of maximum volume and having the necessary oil-solvent ratio, i.e., containing less than 6 to 8% oil (primary filtrate) from the said compartments without interruption of the operation of the filter.

Figure 4:
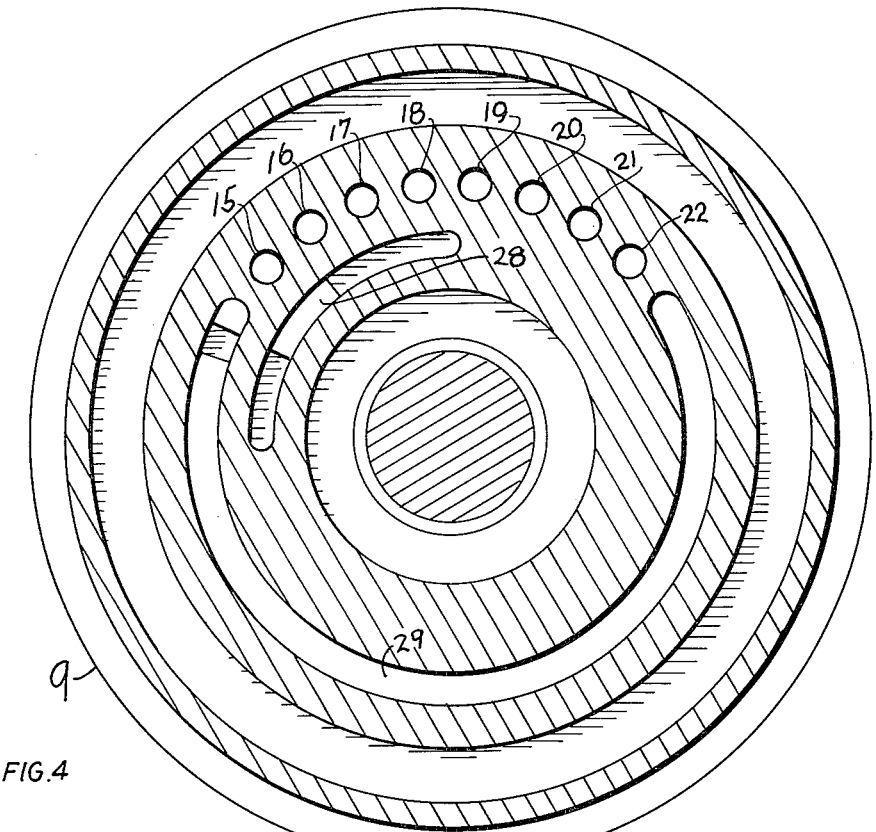
FIGURE 4 is a sectional view of the filter taken along the line IV—IV of FIGURE 3, showing the position of the slots in the stationary valve housing of the control head.

For this purpose the filtrate streams from compartments VI through IX, for example, can be subdivided by filtrate discharge openings 15 to 22 of the stationary valve housing 9, as shown in FIGURE 4. The openings 15 to 22 are in fluid communication with a control cylinder 23, arranged horizontally in front of the face of the stationary valve housing 9, via corresponding conduits 15′ to 22′ which are mounted on the control cylinder at equidistantly spaced apart openings in the cylinder 23.

The control cylinder 23 includes conduits 13 and 14 for withdrawal of the two collected wash filtrates, and a displacement piston 24 positioned therein. The piston 24 is used to separate the individual oil-rich wash filtrate influxes from the individual oil-deficient wash filtrate influxes in the cylinder 23. The piston 24 may be wide enough to cover two adjacent passage openings, e.g., as shown in FIGURE 2, the openings of passages 18′ and 19′. The piston 24 thus performs the function performed in conventional apparatus by fixed separation stops or bridges. Control piston 24 can be externally displaced, e.g., by crank 25 and threaded shaft 26, to subdivide the zone from which wash filtrate streams flow to conduits 13 and 14 as desired, without interrupting operation of the filter or dismantling of the control head 8. Appropriate adjustments in the position of piston 24 changes the ratio of oil-rich to oil-deficient wash filtrate displacement. Thus, under all operating conditions, it is possible to recover the maximum amount of re-usable wash filtrate. In the embodiment illustrated for instance, displacement of the piston 24 by the width of one of the openings of the cylinder 23 communicating with conduits 15′ to 22′ deflects one half of the wash filtrate of one of the filter compartments VI to IX.

Filtration is also greatly improved by the use of the additional ventilation pipes 27, shown in FIGURES 1, 3, and 6, which communicate with the filter compartments. In the embodiment shown in FIGURE 1, when the wax-containing oil solution from which the wax is to be separated is withdrawn out of the filter tank 2, filtration begins in filter compartment XI and ends in filter compartment III, with the filter compartment or cell and their associated filtrate conduits 6 becoming filled with primary filtrate.

The primary filtrate in such compartments can, of course, be completely discharged only after the compartment in which it is formed emerges from the position occupied by compartment III in FIGURE 1. Since the wax cake formed on the filter cloth is very impermeable and cannot be washed at this point, no gas can flow through the filter cake and the primary filtrate in the compartment cannot readily flow out of such compartment. The compartments will only empty slowly after the beginning of washing operations, at which point the wash filtrate will become mixed with oil-rich primary filtrate and both will be carried along into the positions adapted for the removal of wash filtrate.

In order to achieve the removal of a maximum quantity of usable wash filtrate with as little as possible content of primary filtrate, it is necessary to insure rapid and complete discharge of the primary filtrate from the filter compartments.

Figure 5:
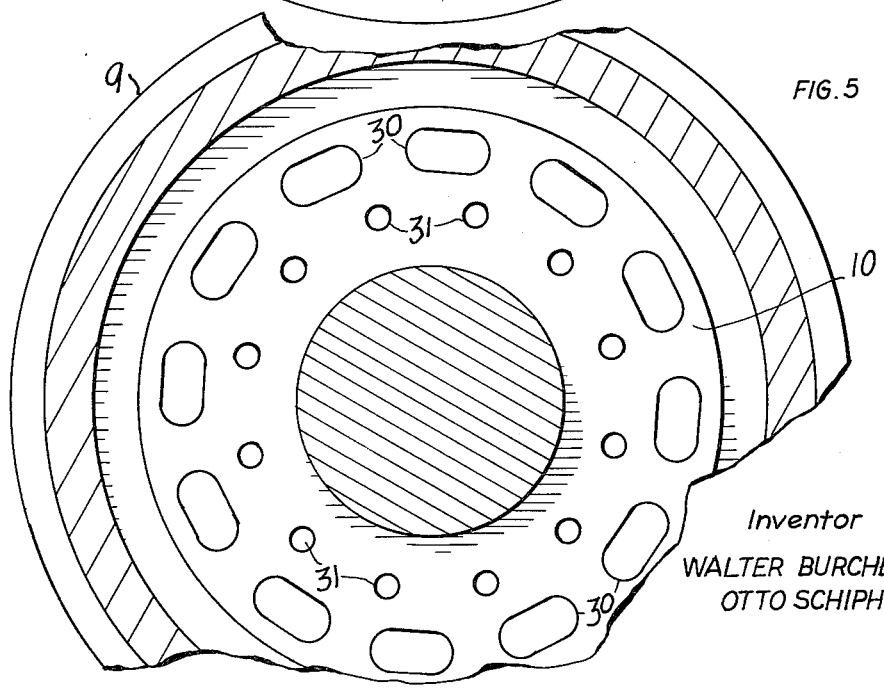
FIGURE 5 is a sectional view of the filter taken along lines V—V of FIGURE 3, illustrating the rotating valve seat of the rotary drum.

This is achieved by admitting gas into the compartments I to XII through pipes 27, shortly after the compartments emerge from the solids-containing liquid. The gas is introduced into the compartments I to XII through the pipes 27 by slot-shaped distributor 28 in the valve housing 9, and associate openings 31 in the valve seat 10, as illustrated in FIGURES 4 and 5. Distributor 28 extends over an arc of approximately 90°, but it is closed by bridges with exception of the direction of compartment IV in FIGURE 1, so that the oil-rich primary filtrate is completely emptied as the compartments traverse the course occupied by compartments III to V, preferably IV. Thus, a wash filtrate for one or even two collected streams can be recovered by afterwards washing the filter cakes brought under fresh suction. Such filtrate has a much smaller oil content and can be directly returned to the filtering process to dilute the wax-containing oil solution being filtered or to be used as the first wash liquid.

Illustrative of the internal construction of the control head 8, sectional views taken on line IV—IV and V—V of FIGURE 3 are depicted in FIGURES 4 and 5, respectively. The sectional view IV—IV, which is illustrated in FIGURE 4, is taken through the stationary valve housing 9 of control head 8. Specifically, it shows the arrangement on the side of the control head of the openings 15–22 which communicate with the control cylinder 23 via conduits 15′ and 22′. The remaining major portion of the area of the circle on which the openings 15–22 lie, is taken up by a single further opening 29. Concentrically and inwardly spaced from the circle described by openings 15–22, and 29, there is provided a slot-shaped opening 28, which is in fluid communication with the ventilation pipes 27.

FIGURE 5 shows the surface or face of value seat 10 which rotates with the filter drum in the plane where it contacts the stationary valve housing 9 and is a front elevation of rotating valve seat 10. The outer apertures 30 formed in a circle, are the terminal openings of the pipe conduits 6 (FIGURES 1, 3 and 6), while the smaller openings 31 forming an inner circle are the terminal openings of the ventilation pipes 27 (FIGURES 1, 3 and 6).

The entire operation performed by apparatus constructed in accordance with the present invention will now be explained with reference to a particular embodiment, by way of example, after describing for contrast conventional practice.

In conventional dewaxing operations for lube oil refineries, the control head is set for best filtration of the heaviest fraction to be processed, e.g. for highly viscous cylinder oil having a density of 0.930 and a viscosity of 41 centistokes at 100° C. However, assume that a lighter lubrication oil fraction having a density of 0.900 and a viscosity of 29 centistokes at 50° C. must also be processed for a period of time without interrupting the operation of the filter, or opening and changing the control head. In a typical conventional filtration operation, such a wax-containing, lighter lubricating oil feed, at a temperature of about 60° C. and at a rate of 13 cubic meters per hour is mixed in a first dilution step with 19.5 cubic meters per hour of fresh (regenerated) solvent (a mixture of about 50% by volume of toluene and 50% by volume of methylethylketone) and is cooled to about −23° C. 32.5 cubic meters per hour of a cold fresh (regenerated) solvent mixture is then added to a second dilution step, and the oil-solvent mixture further cooled to −28° C. The diluted and cooled oil-solvent mixture is then separated from the wax which has crystallized out of the mixture in a conventional rotary drum vacuum filter (2.2 cubic meters per hour plus 14.8 cubic meters per hour of solvent). In this operation, 30 cubic meters per hour of a cold fresh (regenerated) solvent mixture is used for washing the filter cake. There is obtained in this manner, 74 cubic meters per hour of primary filtrate solution containing 14.3% by volume of dewaxed oil, and 4 cubic meters per hour of wash filtrate containing 5.5% by volume of dewaxed oil.

In contrast, by using a rotary drum vacuum filter of this invention, and with outlets adjusted within the control cylinder for best operation of the selfsame lighter lubricating oil feed, the following results are obtained with operating conditions otherwise the same.

50 cubic meters per hour of primary filtrate containing 18.7% per volume of dewaxed oil.

8 cubic meters per hour of rich wash filtrate containing 8% by volume of dewaxed oil.

20 cubic meters per hour of deficient wash filtrate containing 4% by volume of dewaxed oil.

Both wash filtrates are used for the second dilution step, thereby substantially entirely eliminating the necessity of introducing fresh solvent mixture in this step, as compared to the use of conventional apparatus. Not only is a saving realized in heat and cooling water requirements, to recover the solvent mixture from the primary filtrate, there is also a significant saving in the amount of the energy required for cooling the solvent mixture, obtained originally at a temperature above that of the cooling water, down to −23° C.

Although the present invention has been described and illustrated with reference to a specific example, it is understood that modifications and variation may be made by those skilled in the art within the principles and scope of the invention as expressed in the appended claims.

We claim:
1. A rotary drum vacuum filter for subdividing a primary filtrate stream and a wash filtrate stream including a tank, filter drum and segmented cells around the periphery of said drum which comprises:
  (a) a valve seat integral with said drum and having openings including a filtrate outlet means, said filtrate outlet means being arranged on a circle about the axis of said valve seat;
  (b) a first conduit means provided within said drum between said cells and said filtrate outlet means to provide fluid communication therebetween;
  (c) a stationary valve housing positioned against said valve seat and having openings therein including a primary filtrate outlet means and wash filtrate outlet means, said primary and wash filtrate outlet means being arranged about the axis of said valve housing, said filtrate outlet means of said valve seat being in fluid communication with the primary and wash filtrate outlet means of said valve housing at various positions of said valve seat with respect to said valve housing;
  (d) a control cylinder having a first wash filtrate outlet means and a second wash filtrate outlet means and a plurality of wash filtrate inlet means arranged along said cylinder, said plurality of wash filtrate inlet means of said cylinder being in fluid communication with said wash filtrate outlet means of said valve housing;
  (e) A piston positioned within said control cylinder between said first wash filtrate outlet means and second wash filtrate outlet means and capable of being moved within said cylinder from outside of said cylinder whereby movement of said piston alters the ratio of wash filtrate being respectively withdrawn from said first and second wash filtrate outlet means of said control cylinder, and
  (f) means to move said piston within said cylinder to change said ratio of wash filtrate outlet means.

2. The apparatus as defined in claim 1, wherein said filtrate outlet means of said valve housing and said filtrate inlet means of said control cylinder are slot-shaped.

3. The apparatus defined in claim 1 wherein said wash filtrate outlet means of said valve housing and said wash filtrate inlet means of said control cylinder are comprised of an equal number of a plurality of openings.

4. The apparatus defined in claim 1 wherein said valve housing includes openings to the atmosphere, and wherein said valve seat has openings in fluid communication with the openings to the atmosphere of said valve housing, and wherein said filter drum has a second conduit means extending between the filter cells of said filter drum and the openings in the valve seat which are in fluid communication with the openings to the atmosphere of said valve housing.

References Cited by the Examiner
UNITED STATES PATENTS

| Re. 14,214 | 11/1916 | Akins | 20—393 X |
| 2,174,748 | 10/1939 | Hunter | 210—395 |
| 2,414,451 | 1/1947 | Christensen | 158—36 |

REUBEN FRIEDMAN, *Primary Examiner.*